United States Patent
Balgaard et al.

(10) Patent No.: US 9,943,074 B2
(45) Date of Patent: Apr. 17, 2018

(54) HINGING AND ROTATING COUPLER MECHANISM FOR AVIAN SPINNING WING DECOY

(71) Applicants: Stanley James Balgaard, Evansville, MN (US); Andrew James Balgaard, Aberdeen, SD (US)

(72) Inventors: Stanley James Balgaard, Evansville, MN (US); Andrew James Balgaard, Aberdeen, SD (US)

( * ) Notice: Subject to any disclaimer, the term of this patent is extended or adjusted under 35 U.S.C. 154(b) by 295 days.

(21) Appl. No.: 14/634,658

(22) Filed: Feb. 27, 2015

(65) Prior Publication Data
US 2016/0249600 A1  Sep. 1, 2016

(51) Int. Cl.
*A01M 31/06* (2006.01)
*F16M 11/18* (2006.01)

(52) U.S. Cl.
CPC ............ *A01M 31/06* (2013.01); *F16M 11/18* (2013.01)

(58) Field of Classification Search
CPC .................................................... A01M 31/06
USPC .......................................................... 43/2, 3
See application file for complete search history.

(56) References Cited

U.S. PATENT DOCUMENTS

| | | | | |
|---|---|---|---|---|
| 3,768,192 A * | 10/1973 | Caccamo | ............. | A01M 31/06 43/3 |
| 3,869,823 A * | 3/1975 | Powers | ................ | A01M 31/06 43/3 |
| 5,809,683 A * | 9/1998 | Solomon | ............... | A01M 31/06 43/3 |
| 6,509,028 B2 * | 1/2003 | Williams | ............. | A61K 9/0043 424/434 |
| 6,857,215 B1 * | 2/2005 | Rickrode | ............. | A01M 31/06 43/2 |
| 8,188,691 B1 * | 5/2012 | Twohig | ................. | A01M 31/06 318/139 |
| 8,230,638 B1 * | 7/2012 | Dunaway | .............. | A01M 31/06 43/2 |
| 2001/0004812 A1 * | 6/2001 | Lindaman | ............. | A01M 31/06 43/2 |
| 2008/0078113 A1 * | 4/2008 | Denny | .................. | A01M 31/06 43/2 |
| 2008/0295381 A1 * | 12/2008 | Barr | ...................... | A01M 31/06 43/2 |
| 2009/0007479 A1 * | 1/2009 | Jerome, Sr. | ........... | A01M 31/06 43/2 |
| 2010/0115818 A1 * | 5/2010 | Rogers | ................. | A01M 31/06 43/2 |
| 2011/0232153 A1 * | 9/2011 | Jennings, Jr. | ......... | A01M 31/06 43/2 |
| 2012/0042561 A1 * | 2/2012 | Bain | ..................... | A01M 31/06 43/3 |
| 2012/0240447 A1 * | 9/2012 | Gurner, III | ............ | A01M 31/06 43/2 |
| 2014/0245653 A1 * | 9/2014 | Foster | .................. | A01M 31/06 43/3 |

* cited by examiner

*Primary Examiner* — Christopher P Ellis

(57) ABSTRACT

A novel and improved flexible and pivoting mounting system and an on/off tail switch for a spinning wing decoy is disclosed to thereby provide a spinning wing decoy capable of imitating the lifelike movement of a bird in takeoff, sustained flight and landing.

7 Claims, 9 Drawing Sheets

HINGING AND ROTATING COUPLER MECHANISM FOR AVIAN SPINNING WING DECOY

BACKGROUND OF THE INVENTION

The avian spinning wing decoy has been on the market for over a decade and has been popular among bird hunters. It has proven to be effective in attracting birds into decoy arrangements by simulating the wing motion of a live bird, thus giving the illusion of the wing beat of a bird. In the present application, the avian spinning wing decoy has primarily been attached to a stationary pole stake that elevates it above the ground surface. This pole stake is rigid and holds the avian spinning wing decoy in a stationary position elevated above the ground.

The pivoting coupler mechanism of this present invention, be it an internal or external coupler, attached to an elongated flexible rod provides the natural movement in changing directions of a live bird in flight wherein the head of a bird always is the first part of the body to take the lead when changing directions. The pivoting coupler mechanism, elongated flexible rod and stake application improves on the current design by allowing the avian spinning wing decoy to be elevated and put into multi-directional motion either with the aid of the wind or an attached pull string. This adds a flight like motion to the existing spinning of the wings of the avian spinning wing decoy. The on/off switch located in the rearward tail portion of the decoy is activated by coming into contact with a hard surface.

SUMMARY

A pivoting mounting system for an avian spinning wing decoy, having a support stake; an elongated flexible rod comprising a pivoting coupler mechanism attached to one end of the elongated flexible rod providing an attaching and detaching means to an avian spinning wing decoy allowing avian spinning wing decoy to pivot; a pull chord wherein the elongated flexible rod is moveable by either the wind or by a pull chord; an on/off feature comprising an on/off switch wherein the tail portion of the spinning wing avian body decoy is configured to be engaged, in response to an impact applied to a hard surface such as ground level.

BRIEF DESCRIPTION OF THE FIGURES

The following drawings illustrate the embodiment of this invention but are not exhaustive or limiting.

DETAILED DESCRIPTION OF THE INVENTION

Figure 1:
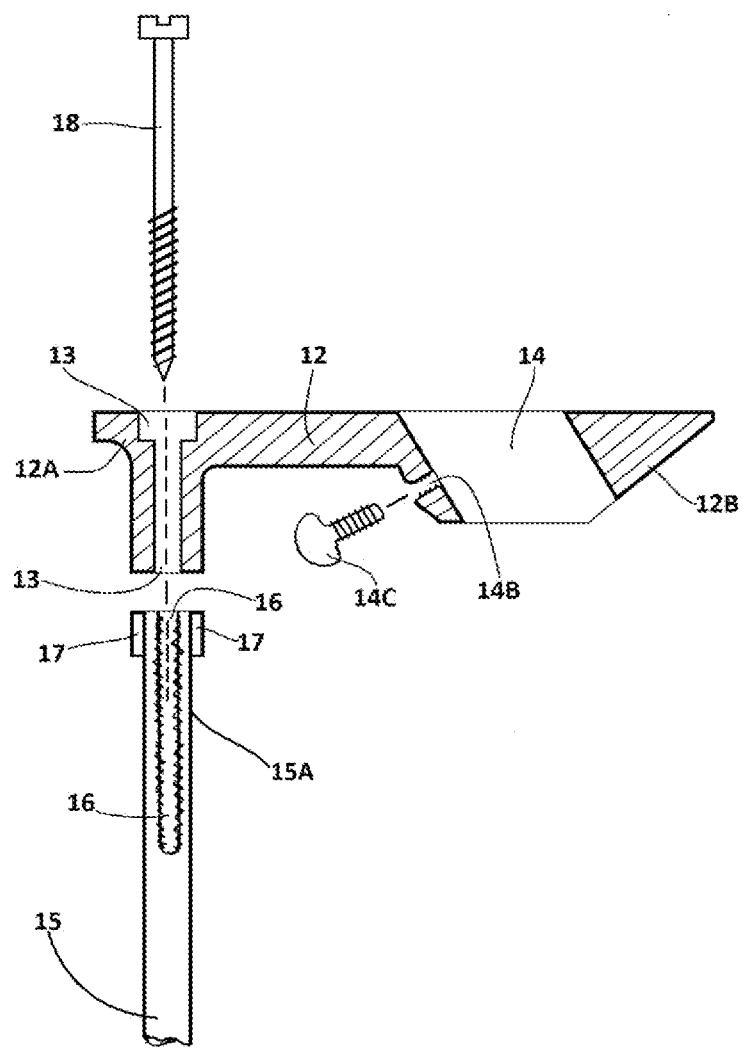
FIG. 1 is a side view of the pivoting coupler mechanism.

FIG. 1 is a side view of the pivoting coupler mechanism (12) and has been divided in half with the facing half having been removed to show the inward working parts.

Pivoting coupler mechanism (12) has both a forward leading end (12A) and a rearward trailing end (12B). An opening (A13) passes through the forward leading end (12A) of the pivoting coupler mechanism (12). The first opposing end (15A) of the elongated flexible rod (15) has an opening (16) and a re-enforcement band (17) that encompasses the outer perimeter. A fastener (18) passes through an opening (13) in the forward leading end (12A) of the pivoting coupler mechanism (12) and is received and fastened into an opening (16) in the first opposing end (15A) of the elongated flexible rod (15). A fastener (18) rotates within the opening (13) while linking the pivoting coupler mechanism (12) to the elongated flexible rod (15) which allows rotation between the pivoting coupler mechanism (12) and the elongated flexible rod (15). An opening (14) passes through the rearward portion of the rearward trailing end (12B) of the pivoting coupler mechanism (12) and receives a protruding member (14A) of an avian spinning wing decoy (10) shown in FIG. 3. An opening (14B) in the pivoting coupler mechanism (12) opens into an opening (14). The mechanical fastener (14C) that travels through an opening (14B) in the pivoting coupler mechanism (12) secures a protruding member (14A) of an avian spinning wing decoy (10) shown in FIG. 3 in place within an opening (14).

Figure 2:
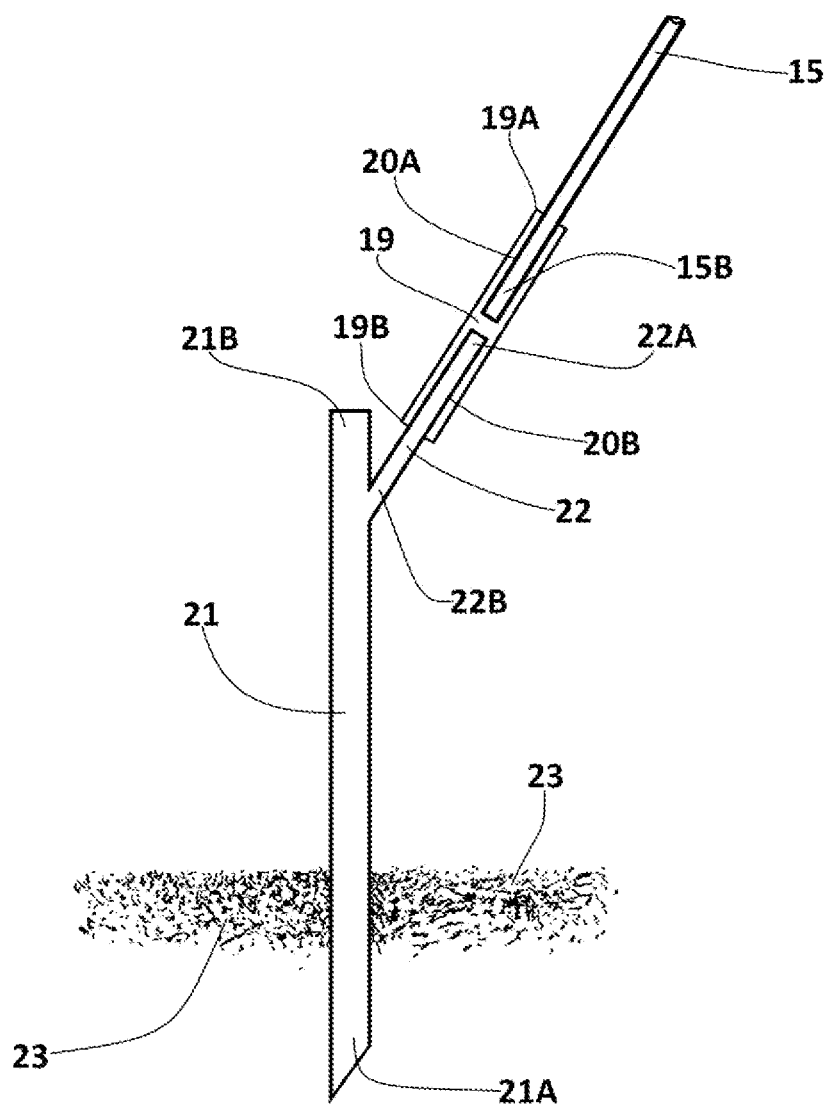
FIG. 2 is a side view of the anchoring stake system and the lower portion of the flexible rod.

FIG. 2 is a side view of the stake and coupler mechanism divided in half with facing half removed to show the inward working parts.

The elongated stake (21) has a first opposing end (21A) and a second opposing end (21B). When in use the first opposing end (21A) of the elongate stake (21) is secured within a firm surface (23) such as the ground and a second opposing end (21B) of the elongated stake (21) extends substantially upward. A protruding member (22), having a first opposing end (22A) and a second opposing end (22B), links to the second opposing end (21B) of the elongated stake (21). The first elongated coupler (19) has a first opposing end (19A) and a second opposing end (19B). The second opposing end (19B) of the first elongated coupler (19) has an opening (20B) that receives the first opposing end (22A) of the protruding member (22) of the elongated stake (21). The diameter of the opening (20B) is slightly larger than the diameter of the second opposing end (22A) of the protruding member (22) allowing it to be attached when in use and detached when in storage. The first opposing end (19A) of the first elongated member (19) has an opening (20A) that receives the second opposing end (158) of the elongated flexible rod (15) linking the second opposing end (15B) of the elongated flexible rod (15) to the first opposing end (19A) of the first elongated coupler (19).

Figure 3:
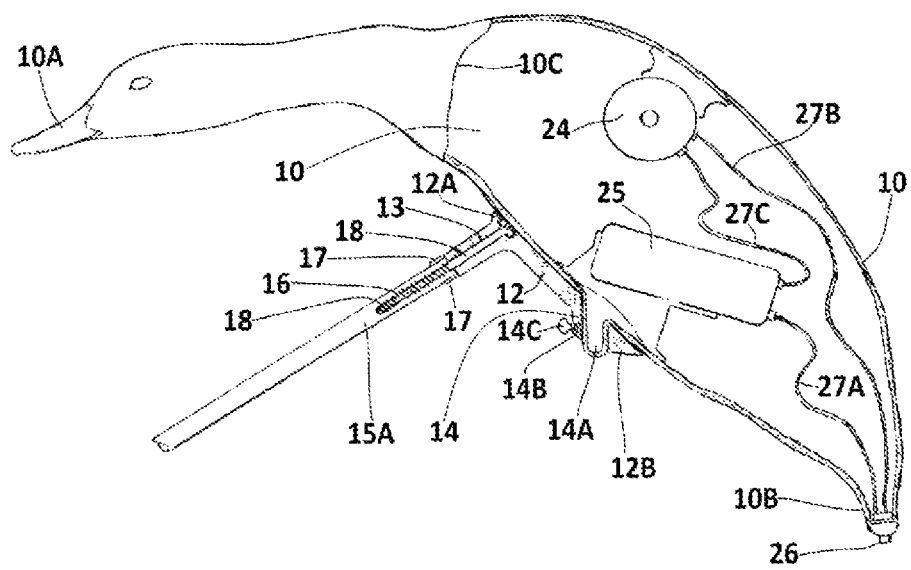
FIG. 3 is a side view of the avian spinning wing decoy and the pivoting coupler mechanism.

FIG. 3 is an avian spinning wing decoy secured within a pivoting coupler mechanism.

The avian spinning wing decoy (10), having a forward leading end (10A) and a rearward trailing end (10B) of the avian spinning wing decoy (10), with a protruding member (14A) that extends outward from the central lower portion of the avian spinning wing decoy (10). A protruding member (14A) of the avian spinning wing decoy (10) has passed through an opening (14) that passes through the rearward portion of the rearward trailing end (12B) of the pivoting coupler mechanism (12) and is secured into an opening (14) by the mechanical fastener (14C) that travels through the threaded opening (14B) in the pivoting coupler mechanism (12) and tightens against the protruding member (14A) of the avian spinning wing decoy (10). The first opposing end (12A) of the pivoting coupler mechanism (12) has an opening (13) that has allowed a fastener (18) to pass through and be received by the threaded opening (16) and secured into the first opposing end (15A) of the elongated flexible rod (15). The fastener (18) pivots within an opening (13) of the forward leading end (12A) of) the pivoting coupler mechanism (12). A re-enforcement band (17) re-enforces the first opposing end (15A) of the elongated flexible rod (15). An electric motor (24) that spins the wings of the avian spinning wing decoy (10) is powered by a battery (25). The power is delivered from a battery (25) to an electric motor (24) through electric power lines (27A) and (27B). The electric power line (27A) connects the battery (25) to an on/off switch (26) located in the rearward trailing end (10B) of the avian spinning wing decoy (10) and the electric power line (27B) connects the on/off switch to the electric motor (24). The ground wire (27C) connects the electric motor (24) to the battery (25). When the on/off switch (26) is turned on power is provided to the electric motor (24) and when the on/off switch (26) is turned off power is denied to the electric motor (24).

Figure 4:
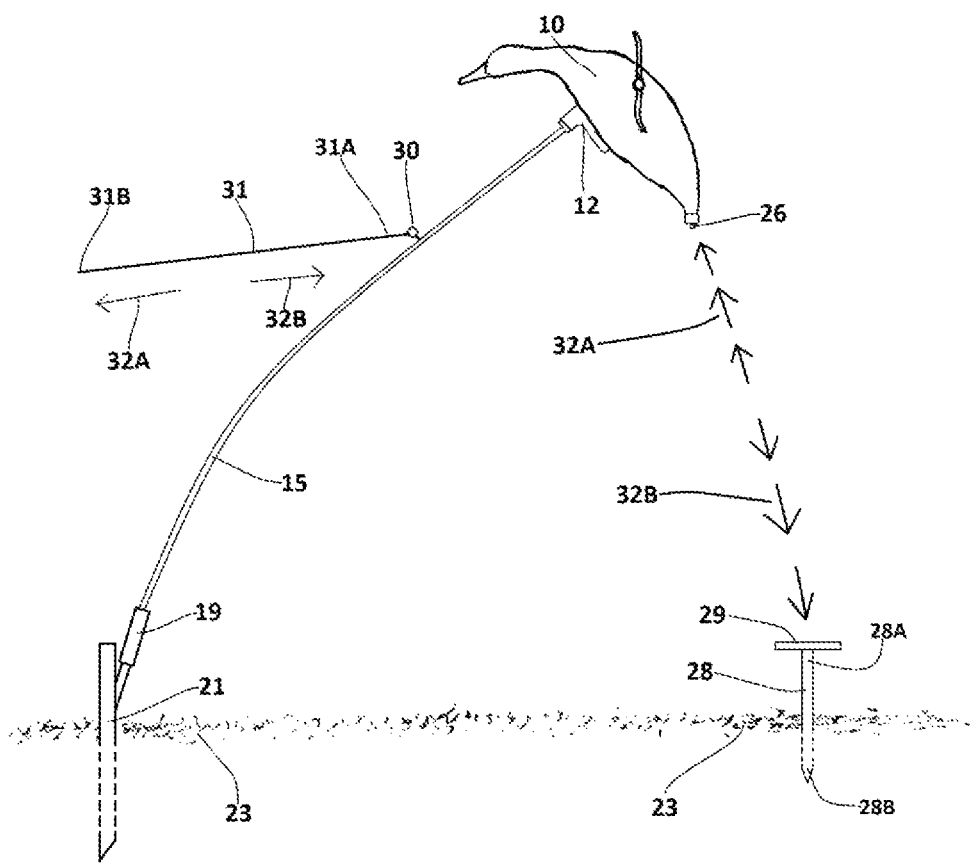
FIG. 4 is a side view of the avian spinning wing decoy being activated by a pull chord.

FIG. 4 is a full side view of the elongated flexible rod and couplers, elongated stake mechanism, avian spinning wing decoy, pull string and the on/off switch activating concept for an electric spinning wing decoy.

The elongated stake mechanism (21) is secured into a firm surface (23) such as the ground and extends substantially upward and couples to an elongated coupler mechanism (19). An elongated coupler mechanism (19) fastens to the elongated flexible rod (15) that also extends substantially upward and couples to the pivoting coupler mechanism (12). An avian spinning wing decoy (10) couples to the pivoting coupler mechanism (12) and is held above a firm surface (23) such as the ground. The elongated flexible rod (15) has a fastener (30) with an opening that a pull cord (31) is attached to. When the pull cord (31) is pulled in the direction indicated by the direction of travel arrow (32A), the avian spinning wing decoy (10) rises. When the pull cord (31) is relaxed the direction of travel arrow (32B) indicates the downward travel of the avian spinning wing decoy (10). The normal range of the direction of travel arrow (32B) does not cause contact of the on/off switch (26) with a firm platform (29). If the operator of the pull cord (30) wishes to activate or deactivate the on/off switch (26) the direction of the travel arrow (32B) may be exaggerated in such a manner to cause a greater range of motion causing the on/off switch (26) to come into contact with a firm platform (29) causing the on/off switch (26) to either activate or deactivate. A platform (29) links to the second elongated stake (28) having a first opposing end (28A) and a second opposing end (28B). The first opposing end (28A) of the second elongated stake (28) is held above the ground when the second opposing end (28B) of the second elongated stake (28) is secured within a firm surface (23) such as the ground.

Figure 5:
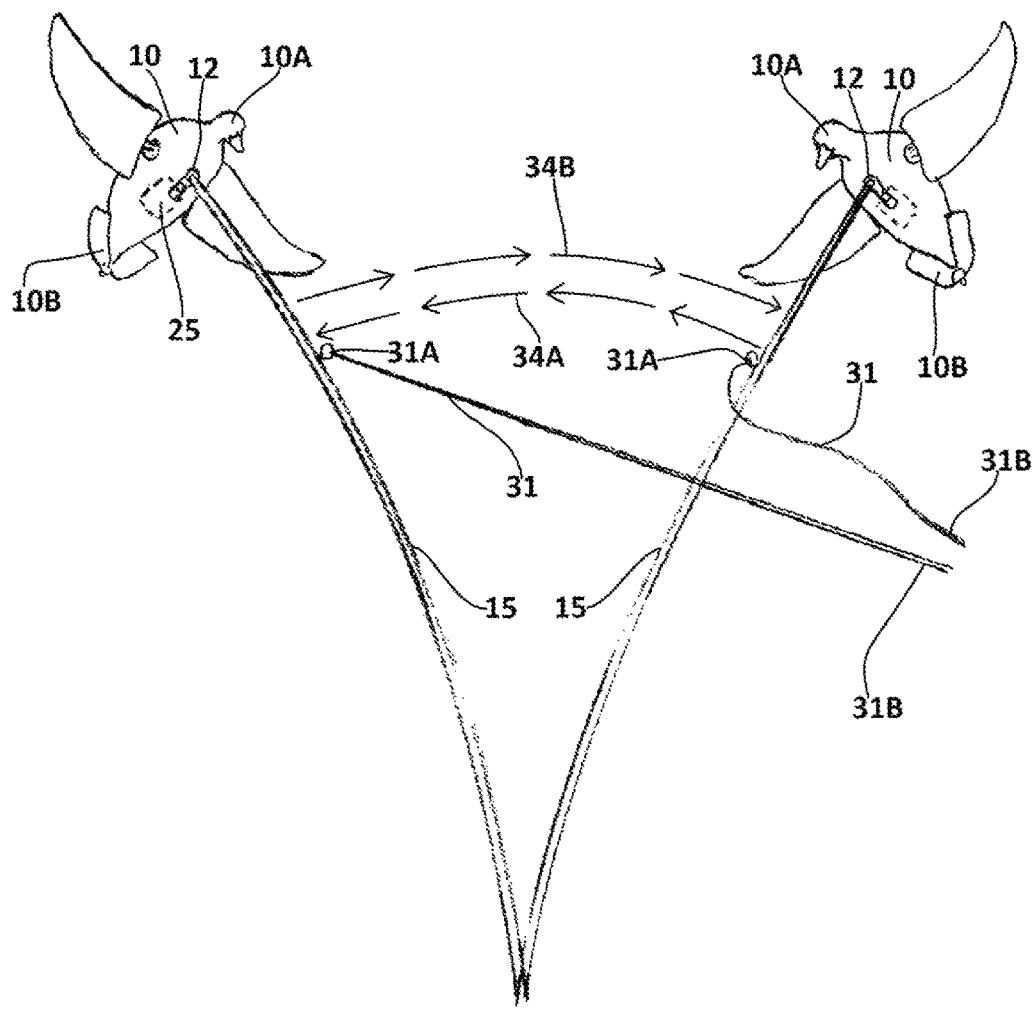
FIG. 5 is a front view of the avian spinning wing decoy being activated by a pull chord.

FIG. 5 shows the pivoting side to side motion of an avian spinning wing decoy.

Arrows (34B) and (34A) show the range of travel from side to side of the avian bird body decoy (10) upon the pivoting coupler mechanism (12) and the elongated flexible rod (15). A pulling and releasing pull cord (31) activates the side to side motion of the avian spinning wing decoy (10) upon the pivoting coupler mechanism (12) and the elongated flexible rod (15). The pull cord (31) is shown pulled tight as it is being pulled, and is also shown in a relaxed state allowing the avian spinning wing decoy (10) to travel from side to side which is indicated by arrows (34A) and (34B). The distance of side to side travel indicated by arrows (34A) and (34B) is determined by how aggressively the pull cord (31) is pulled. The dotted line within the avian spinning wing decoy (10) indicates where the battery (25) is located. The battery (25) acts as a counter weight, ensuring that the leading forward end (10A) of the avian spinning wing decoy (10) always leads in the direction of travel indicated by arrows (34A) and (34B). This motion can also be activated by the wind.

Figure 6:
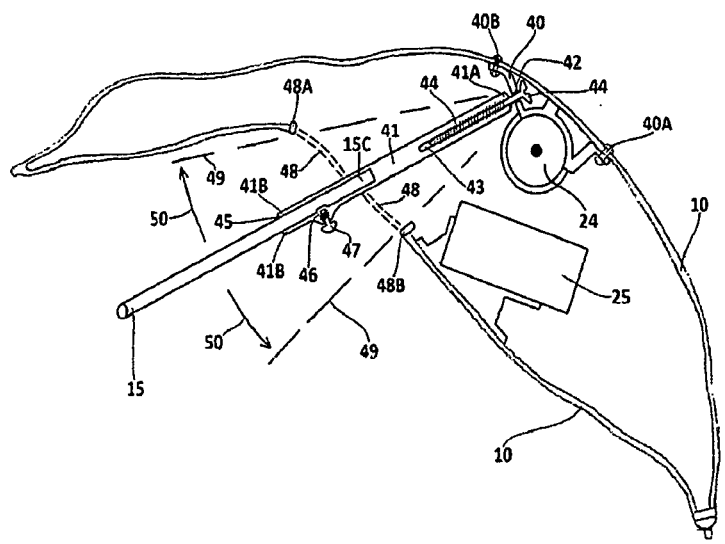
FIG. 6 is a side view of the avian spinning wing decoy body with a pivoting coupler mechanism.

FIG. 6 shows the side view of an avian spinning wing decoy and all its internal and external working components and is divided in half with the facing side removed to show its internal components.

The mounted bracket (40) attaches to an inward upper central portion of the avian bird body decoy (10) by a fastener (40A) and a fastener (40B). An electric motor (24) attaches to the mounted bracket (40). An opening (42) is in the mounted bracket (40). An elongated coupler (41) having a first opposing end (41A) and a second opposing end (41B). The first opposing end (41A) of the elongated coupler (41) has an opening (43). A fastener (44) passes through an opening (42) into a mounted bracket (40) and fastens into an opening (43) within the forward leading end (41A) of the elongated coupler (41). The fastener (44) rotates and hinges within an opening (42) in the mounted bracket (40). A first opposing end (15C) of the elongated flexible rod (15) is received into an opening (45) in the second opposing end (41B) of the elongated coupler (41). An opening (46) in the second opposing end (41B) of the elongated coupler (41) allows the mechanical fastener (47) to pass through and tighten the first opposing end (15C) against the elongated flexible rod (15) and secures the first opposing end (15C) of the elongated flexible rod (15) within an opening (45) in the second opposing end (41B) of the elongated coupler (41) and is assembled for use. When the mechanical fastener (47) is loosened, the first opposing end (15C) of the elongated the flexible rod (15) can be removed from an opening (45) in the second opposing end (41B) of the elongated coupler (41) and is dis-assembled for storage. Short broken lines (48) show an elongated opening (48) in the bottom forward center portion of the avian spinning wing decoy (10). A noise silencer (48A) is located in the forward leading end of an elongated opening (48) and a noise silencer (48B) is located in the rearward trailing end of the elongated opening (48). An elongated coupler (41) passes through an elongated opening (48) and allows the second opposing end (41B) of the elongated coupler (41) to extend out of the avian spinning wing decoy (10). Long broken lines (49) and arrows (50) indicate the hinging range of the elongated coupler (41) as it hinges upon the fastener (44) within an opening (42) of the mounted bracket (40). A fastener (44) within an opening (42) of the mounted bracket (40) also provides for rotation and hinging of the avian spinning wing decoy (10). A battery (25) is centered underneath an opening (42) of the mounted bracket (40) that receives a fastener (44) and acts as a counterweight keeping the avian spinning wing decoy (10) in proper position during use. An electric motor (24) rotates the spinning wings (114) of the avian spinning wing decoy (10). This application will also work without an electric motor (24) with wind rotated spinning wings (114).

Figure 7:
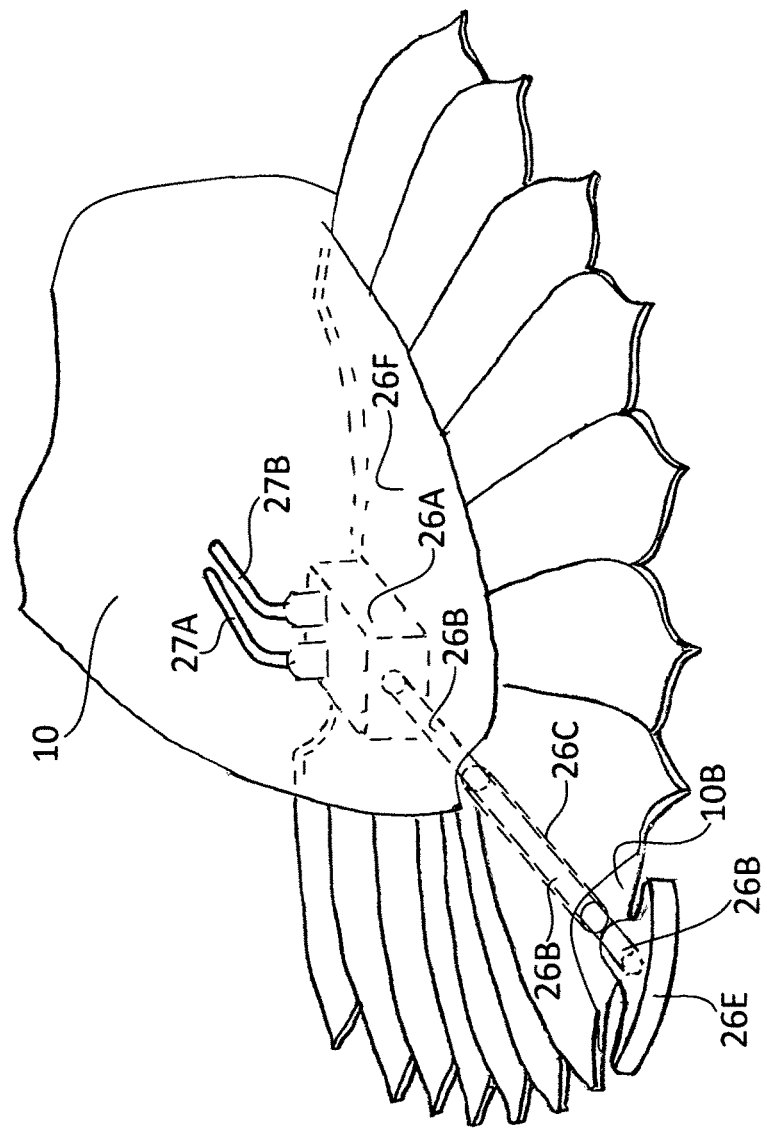
FIG. 7 is a rearward view of an on/off switch housed within the rearward tail portion of the avian decoy body.

FIG. 7 is a rearward view of an on/off switch housed within the rearward tail portion of an avian decoy body.

A switch box (26A) is fastened to a mounting bracket (26F) within the rearward portion of the avian bird body decoy (10). A switch activating extension (26B) is housed within an opening (26C) in the rearward portion of the tail (10B) and extends outward fastening into an activation section (26E). When the activation section (26E) comes into contact with a firm surface (23) such as the ground or a firm platform (29) the on/off switch (26) is activated on or off. Power lines (27A) and (27B) described in FIG. 3.

Figure 8:
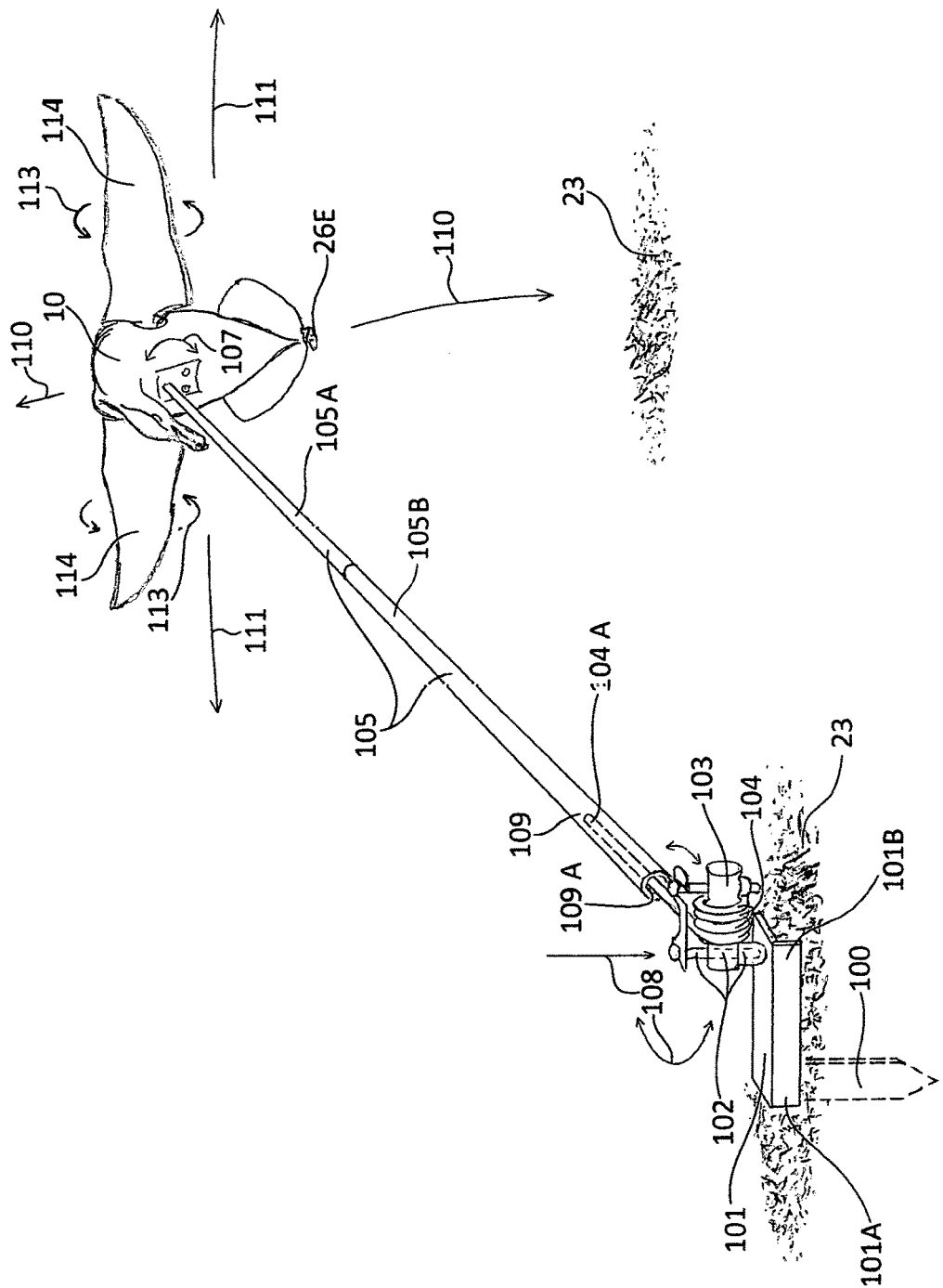
FIG. 8 is a front quartering view of the spinning wing decoy and a lift assisting coil spring apparatus.

FIG. 8 is a front quartering view of the spinning wing decoy and the lift assisting coil spring apparatus.

A support stake (100) is linked to the first opposing end (101A) of a cross member (101). In use, the support stake (100) is secured within a firm surface (23), such as the ground. The second opposing end (101B) of the cross member (101) is linked to a pivotal pin (102) that extends upward and passes through an opening (103C) in a rotating member (103). The rotating member (103) rotates 360 degrees indicated by arrow (108) around a support pin (102). The rotating member (103) passes through a coil spring (104). A telescoping tube (105) having a first member (105A) and a second member (105B). The first opposing end (104A) of the coil spring (104) is housed within an opening (109A) within the first opposing end (109) of the telescoping tube (105B). In use, the first member (105A) extends out of second member (105B). In storage, the first member (105A) is contained within the second member (105B). The telescoping tube (105) can be adapted to receive either the coupler mechanism of FIG. 3 or FIG. 6. and can be removed from the forward leading (104A) of the coil spring (104). An arrow (107) indicates the rotation of the avian spinning wing decoy (10) upon the coupler mechanism of FIG. 3 or FIG. 6. Arrows (110) indicate the rising and falling of the avian spinning wing decoy (10). The rising and falling of the avian spinning wing decoy (10) is assisted by the coil spring (104) when pressure is applied upward or downward by the user on the lower trailing end (109) of the telescoping tube (105). Arrows (111) indicate the side to side motion of the avian spinning wing decoy (10) that cooperate with arrow (108) showing the rotation of the rotating member (103). Arrows (113) show the spinning wings (114) of the avian spinning wing decoy (10).

Figure 9:
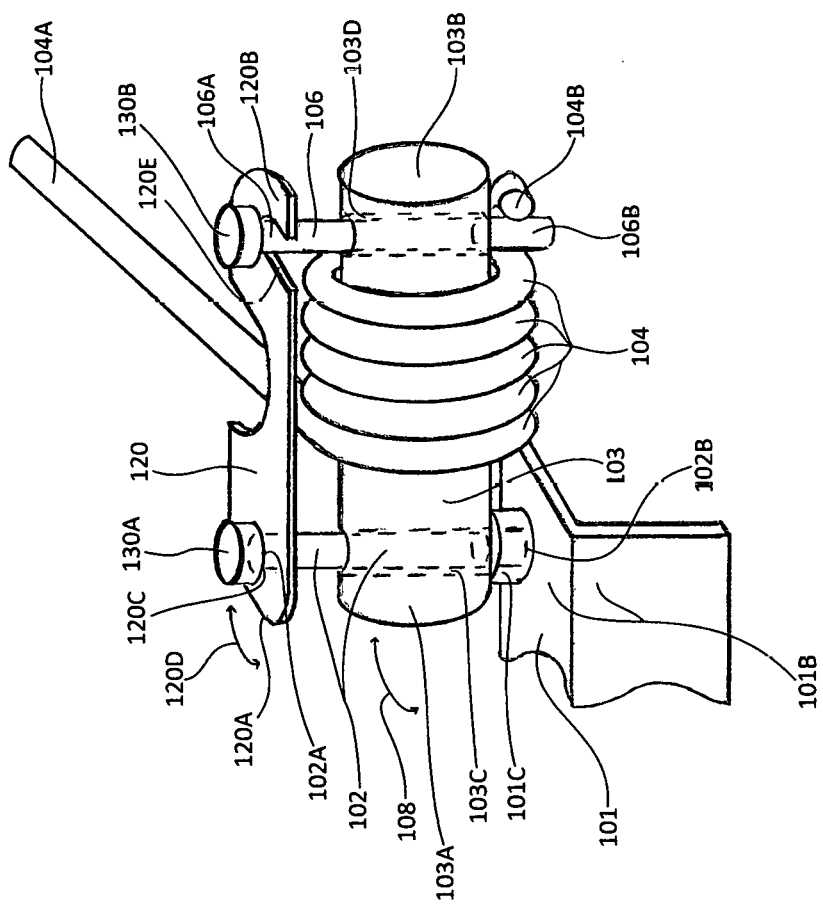
FIG. 9 is an enlarged front quartering view of the lift assisting coil spring apparatus.

FIG. 9 is an enlarged front quartering view of the coil spring apparatus.

The first opposing end (101B) of the cross member (101) is linked to a pivotal pin (102) at the second opposing end (102B) of the pivotal pin (102). The pivotal pin (102) extends upward and passes through a spacer (101C) and through an opening indicated by dotted lines (103C) in the first opposing end (103A) of the rotating member (103) and allows the rotating member (103) to rotate 360 degrees, indicated by arrow (108), about the pivotal pin (102). Rotating member (103) passes through a coil spring (104). The second opposing end (103B) of the rotating member (103) has an opening indicated by broken lines (103D). A locking pin (106) having an upper opposing end (106A) and a lower opposing end (106B). The second opposing end (104B) of the coil spring (104) partially wraps around the lower opposing end (106B) of the locking pin (106) and prevents the rotation of the coil spring (104) when in use. The first opposing end (104A) of the coil spring (104) extends outward. An opening (120C) in the first opposing end (120A) of the limiter (120) allows the upper leading end (102A) of the pivotal pin (102) to pass through an opening (120C) allowing rotation of the locking member (120) indicated by the arrow (120D). A U-shaped opening (120E) of the locking member (120) partially wraps around the upper opposing end (106A) of the locking pin (106). A limiter (120) prohibits the range of rising of the first opposing member end (104A) of the coil spring (104). A prohibitor cap (130A) located on the upper leading end (102A) of the pivotal pin (102) holds the limiter (120) in place. Prohibitor cap (130B) located on the upper leading end (106A) of the locking pin (106) hold the limiter (120) in place.

The invention claimed is:

1. A pivoting mounting system for an avian spinning wing decoy, comprising:
    A support stake having an elongated flexible rod attached thereto;
    the elongated flexible rod having a pivoting coupler mechanism attached to one end;
    the pivoting coupler mechanism being configured to pivotally attach the avian spinning wing decoy;
    the spinning wing avian body decoy having an on/off switch located in a tail portion;
    an elevated platform or a hard surface located at ground level to activate the on/off switch in response to impact from said tail portion;
    wherein the elongated flexible rod is moveable by either a pull chord or by the wind;
    whereby, in response to a force applied to the pull cord, the elongated flexible rod is set into motion, thus activating the coupler about its axis giving the avian spinning wing decoy a life-like motion.

2. The pivoting mounting system for an avian spinning wing decoy of claim 1, wherein the elongated flexible rod provides a multi-directional movement for the avian body decoy when activated by the pull cord or wind.

3. The pivoting coupler mechanism of claim 1, wherein the motion of said flexible rod activates a back and forth movement of the avian spinning wing decoy.

4. The pivoting mounting system for an avian spinning wing decoy of claim 1, wherein the avian spinning wing decoy can be detached from the pivoting coupler mechanism when not in use.

5. The pivoting mounting system for an avian spinning wing decoy of claim 1, wherein the elongated flexible rod can be detached from the support stake when not in use.

6. The pivoting mounting system for an avian spinning wing decoy of claim 1, wherein a battery and a motor are housed within the body of the avian spinning wing decoy which drives a pair of exterior wings;
    the on/off switch is housed within the tail portion of the spinning wing decoy and extends outward;
    whereby, in response to an impact with the ground or said hard surface the switch is activated on or off.

7. The pivoting mounting system for an avian spinning wing decoy of claim 1, wherein the support stake provides a point of rotation for a member that is housed within a coil spring, allowing for the rising and lowering of and the 360-degree rotation of the spinning wing decoy.

* * * * *